Patented Oct. 5, 1943

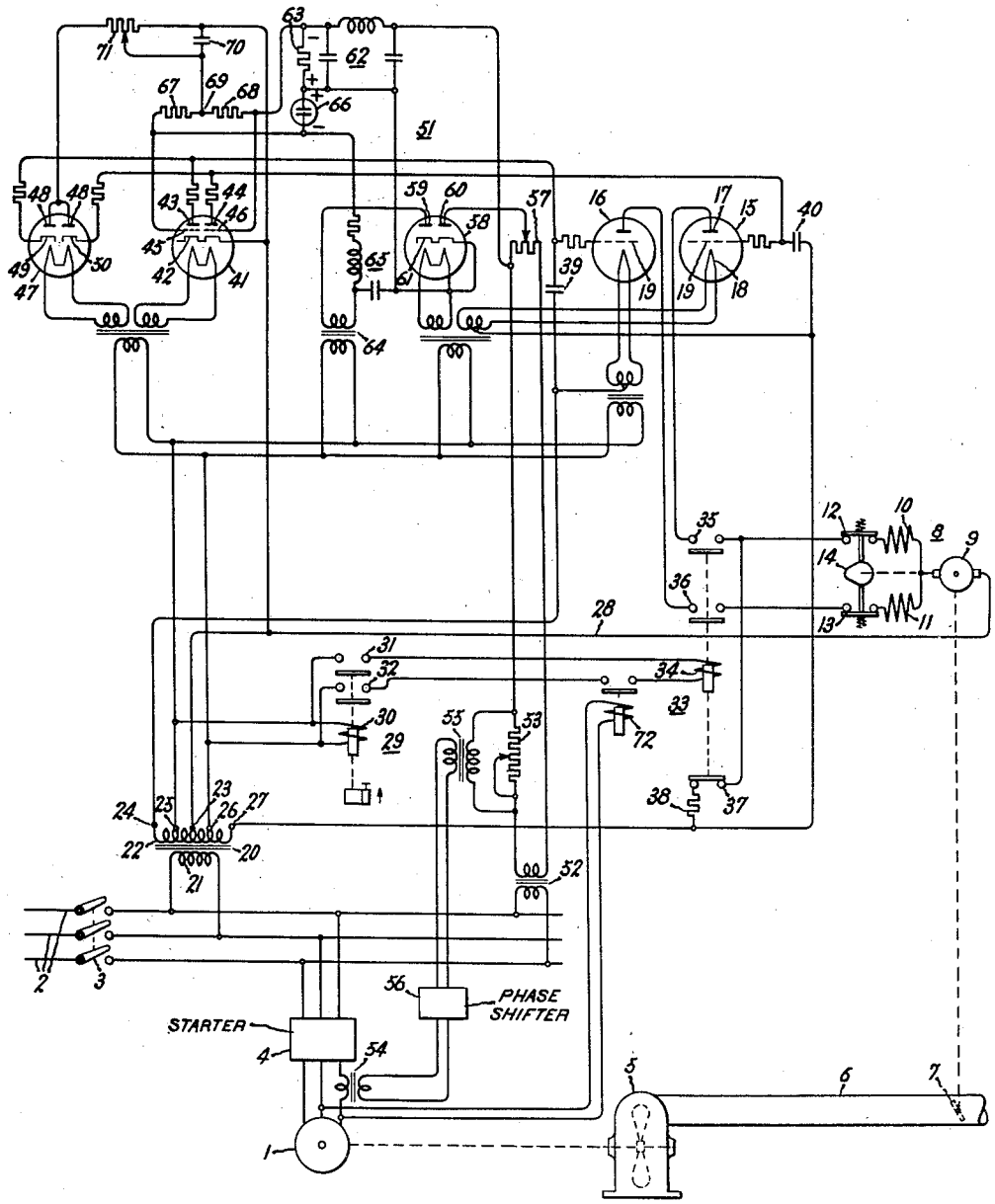

2,331,123

UNITED STATES PATENT OFFICE 2,331,123

ELECTRIC MOTOR CONTROL SYSTEM

Henry H. Leigh, Schenectady, N. Y., assignor to General Electric Company, a corporation of New York Application February 21, 1942, Serial No. 431,389

20 Claims. (Cl. 172—274)

My invention relates to electric control systems and more particularly to electric valve control systems which may be employed to control electric translating apparatus.

In many electric control systems it is desired to provide apparatus to maintain the load demanded by a system within a predetermined range of values, or at a predetermined desired value. For example, in systems such as electric motor control systems, it is frequently important to control either the motor or apparatus associated with the motor to maintain the load at a fixed or constant value. In accordance with the teachings of my invention described hereinafter, I provide a new and improved electric valve control system of this nature.

It is an object of my invention to provide a new and improved electric control system.

It is another object of my invention to provide a new and improved electric control system for electric motors.

It is a further object of my invention to provide a new and improved electric control system wherein the power demanded by electric translating apparatus may be maintained within a predetermined range of values or at a predetermined fixed value.

It is a still further object of my invention to provide a new and improved electric control system for maintaining the power consumed by a translating device at a predetermined value, and wherein means are provided to compensate for variations in the voltage of the supply circuit.

Briefly stated, in the illustrated embodiment of my invention I provide an electric valve control system for electric translating apparatus, such as a motor, which maintains the power consumed by the motor at a substantially constant value and which provides means to compensate for line or supply voltage variations.

For a better understanding of my invention, reference may be had to the following description taken in connection with the accompanying drawing, and its scope will be pointed out in the appended claims. The single figure of the accompanying drawing diagrammatically illustrates an embodiment of my invention as applied to an electric valve control system for controlling the operation of an alternating current motor.

Referring now to the single figure of the drawing, I have there illustrated my invention as applied to an electric valve control system for controlling the amount of power demanded by electric translating apparatus such as a motor 1, which may be of the induction type, and which is energized from an alternating current supply circuit 2 through a switch or circuit breaker 3 and starting means 4. The motor 1 may be connected to drive a fan 5 which propels a fluid, such as air, through a conduit 6. The load of the motor 1 and the fan 5 is controlled by a valve or gate 7.

The load demanded by the motor 1 is controlled by a pilot motor 8 having an armature 9 and a pair of opposing field windings 10 and 11 which are selectively energized by apparatus described hereinafter to control the position and direction of rotation of the armature 9, thereby controlling the position of the valve 7. The pilot motor 8 is provided with limit switches 12 and 13 which are operated by suitable means, such as a cam 14, which is mechanically coupled to the motor armature 9 to open the field winding and armature circuits when the motor armature 9 reaches either one of the extreme positions.

I provide a pair of electric valve means 15 and 16 which are connected to field windings 10 and 11, respectively, and which transmit thereto different amounts of current or selectively energize these windings to determine the position of the motor armature 9. The electric valve means 15 and 16 are preferably of the type employing an ionizable medium, such as a gas or a vapor, and each includes an anode 17, a cathode 18, and a control member 19. The anode-cathode circuits of electric valve means 15 and 16 are energized from the supply circuit 2 through a transformer 20 having a primary winding 21 and a secondary winding 22 provided with an intermediate or neutral connection 23 and taps 24–27, inclusive. The electric valve means 15 is energized from the right-hand portion of the secondary winding 22 and the electric valve means 16 is energized from the left-hand portion of the winding 22, the circuits being completed through the armature 9 of motor 8 and conductor 28 which is connected to the neutral connection 23.

In order to delay the operation of the system for a predetermined interval of time after the closure of switch 3, I provide a time delay relay 29 provided with an actuating coil 30 and contacts 31 and 32 which control the energization of a contactor 33 which is connected to selectively open and close the circuits for the windings of motor 8. Contactor 33 is provided with an actuating coil 34 and contacts 35, 36 and 37. Contacts 35 and 36 are connected in circuit with field windings 10 and 11. As a means for assuring that the motor 10 is moved to a predetermined initial condition, such as an initially closed position, in order to initiate operation of the system from a given condition, I employ contacts 37 which connect one of the field windings, such as field winding 10, to be energized from the right-hand portion of the secondary winding 22 of transformer 20. This circuit is, of course, completed in series relation with the armature 9 of motor 8, and when the contacts 37 are in the closed circuit position the field winding 10 and armature 9 are energized through resistance 38 so that the motor 8 is always biased to a desired position.

I employ in the control of the conductivities of electric valve means 15 and 16 a circuit arrangement disclosed and broadly claimed in a copending patent application of Elmo E. Moyer, Serial No. 358,922, filed September 28, 1940, and which is assigned to the assignee of the present application. This arrangement is an improved phase shifting type circuit wherein an alternating voltage is impressed on control members 19 and wherein there is superimposed on the alternating voltages unidirectional voltages of predetermined magnitude and polarity to control the amount of current conducted by the electric valve means during the respective positive half cycles of applied anode-cathode voltage. More particularly, the control circuit comprises capacitances 39 and 40 which are charged in opposite directions by electric discharge devices described hereinafter, and the relative amounts of charge established thereon during the positive and negative half cycles determines the polarity of the resultant unidirectional voltages supplied by the capacitances. For example, during half cycles of voltage of one polarity derived from secondary winding 22 of transformer 20, capacitance 39 is charged through an electric discharge device 41. The electric discharge device 41 may be arranged to have a common cathode 42 and anodes 43 and 44 and associated grids 45 and 46. The capacitance 39 is charged in one direction by the left-hand path of discharge device 41 comprising anode 43 and the cathode 42. On the other hand, the capacitance 40 is charged in one direction by the right-hand discharge path of the discharge device 41 which comprises the anode 44 and the cathode 42. During the half cycles of reverse polarity, the capacitances 39 and 40 are charged in opposite directions by an electric discharge device 47 which is poled in opposition to discharge device 41 and which may comprise a pair of common anodes 48 and electrically insulated cathodes 49 and 50.

The magnitude of the unidirectional charges of capacitances 39 and 40, that is, the magnitude of the bias voltages, is determined by the relative amounts of current conducted by electric discharge device 41 and discharge device 47. Furthermore, the conductivity of the electric discharge device 41, that is, the conductivities of the respective associated discharge paths, selectively controls the electric valve means 15 and 16, thereby selectively controlling the energization of windings 10 and 11 and controlling the position of the motor 8.

As a means for selectively controlling the conductivities of the discharge paths of the discharge device 41 and to control the position of the motor 8, I provide a control circuit 51. Control circuit 51 controls the pilot motor 8 to maintain the power consumed by motor 1 at a substantially constant value. Generally speaking, the system which I provide comprises means for producing one electrical quantity which is responsive to the voltage applied to motor 1 and a second electrical quantity which is responsive to the current consumed by the motor 1. These two quantities are added, preferably in phase, and the sum is compared to a source of reference voltage. The difference between the sum of the electrical quantities and the source of reference voltage is employed to control selectively the conductivities of the respective discharge paths of the discharge device 41.

More particularly, I employ a transformer 52 which is energized in response to the voltage of one phase of circuit 2. Of course, I may employ polyphase means so that the voltage obtained is representative of the three-phase system of voltages. I also employ a voltage divider 53 which is energized in response to the current demanded by motor 1. In the arrangement illustrated, I employ current transformers 54 and 55 which are energized in response to the current demanded by one phase of the motor 1. It will be appreciated also in this instance that I may employ a polyphase responsive system instead of a single phase if desired. Phase shifting means 56 may be employed so that the voltage responsive to line voltage and the voltage responsive to current are in phase. I connect in circuit with the voltage divider 53 a voltage divider 57, the voltage across its terminals, of course, representing the sum of the voltages produced by transformer 52 and voltage divider 53.

The voltages which are respectively responsive to voltage and current are rectified by a suitable rectifier or discharge device 58 which may comprise a pair of anodes 59 and 60 and a cathode 61. The sum of the two voltages is rectified through the right-hand discharge path comprising the anode 60. A filter circuit 62 is employed to filter the unidirectional voltage. A voltage divider, such as a resistance 63, is connected across the output of the filter circuit 62, and the voltage appearing across the resistance 63 is a unidirectional voltage of the polarity indicated, the magnitude of which represents approximately the power demanded by the motor 1 inasmuch as it varies in accordance with the voltage and the current. Of course, it will be appreciated that the arrangement which I provide, wherein rectified voltage and current are employed to represent power, does not truly represent true power or watts, because no provision is made to compensate for power factor. In order to provide a source of substantially constant reference voltage with which the voltage produced by resistance 63 is compared, I employ a circuit including a transformer 64 which is energized from the supply circuit 2 through transformer 20. This voltage is rectified by means of the left-hand discharge path of the discharge device 58. A filtering circuit 65 is connected to the output circuit. The output voltage of the filter circuit 65 is connected to a constant voltage device, such as a glow discharge valve 66, which maintains across its terminals a substantially constant voltage when in a conducting condition. The polarity of the voltage appearing across valve 66 is in opposition to that provided by resistance 63.

The difference of the voltages produced by resistance 63 and the glow discharge device 66 is impressed on the grids 45 and 46 of electric discharge device 41 through a voltage divider including resistances 67 and 68 having a neutral connection 69. The neutral connection 69 is connected to the common cathode 42 through a transient absorbing capacitance 70, and the terminals of the resistances 67 and 68, respectively, are connected to grids 45 and 46. The common juncture 69 is also connected to anodes 48 of discharge device 47 through an adjustable resistance 71 which adjusts the relative magnitudes of current conducted by the discharge device 41 and the discharge device 47.

I also provide means for preventing connection of the electric valve regulating system to the pilot motor 8 until the motor 1 comes up to speed, or until normal operating voltage is impressed across the motor 1. This means may comprise a relay 72 having a pair of normally open contacts in series relation with coil 34 of contactor 33 and which is provided with an actuating coil which is responsive to the voltage applied to the motor 1.

The operation of the embodiment of my invention shown in the single figure of the drawing will be explained by considering the system when it is arranged and adjusted to maintain the power consumed by the motor 1 at a substantially constant value. The system is initiated in its operation by closure of switch 3. Upon closure of switch 3, the control system is not immediately placed in operation due to the time delay relay 29 which closes its contacts 30 and 31 with a time delay to permit the cathodes of the electric discharge devices to reach a safe operating temperature. Consequently, contactor 33 is not energized immediately. Due to the closed circuit position of contacts 37, field winding 10 and armature 9 of motor 8 are energized from the supply circuit through transformer 20 so that the motor armature 9 is moved to a predetermined position and the operation of the system is initiated from this predetermined condition.

After the expiration of the time delay period set by the adjustment of relay 29, the relay 29 closes its contacts thereby energizing actuating coil 34 of contactor 33. Upon operation of contactor 33, field windings 10 and 11 of motor 8 are connected to electric valve means 15 and 16, respectively, and the motor is in condition for operation whereby it maintains the power consumed by the motor 1 at a constant value.

Due to the operation of electric discharge device 41 either the electric valve means 15 or 16 conducts current, in this way selectively energizing the field windings 10 and 11 of motor 8. In this manner the position of the gate of valve 7 is controlled, thereby controlling the load or power demanded by the motor. Of course, it is to be understood that the direction of rotation of the pilot motor 8 may be controlled by controlling the relative amounts of current transmitted to the opposing field windings 10 and 11. That is, the pilot motor 8 may be controlled by simultaneously energizing field windings 10 and 11 and by transmitting thereto different amounts of current.

The system is preferably adjusted so that the voltage appearing across the resistance 63 is equal to the voltage appearing across the glow discharge valve 66 for the desired value of power which the motor 1 is to consume. The magnitude of the power which is demanded by the motor 1 is controllable or adjustable by means of resistance 53.

Let it be assumed that when the field winding 10 is energized the motor 8 in operating in a direction to decrease the power demanded by the motor 1, and that when field winding 11 is energized the motor 8 is operating in a direction to increase the power demanded by the motor 1. If the power demanded by motor 1 tends to increase above a predetermined value, the voltage appearing across resistance 63 will consequently increase, effectively lowering the potential of grid 46 and effectively raising the potential of grid 45. As a result, the conductivity of the electric valve means 15 will be increased and the conductivity of electric valve means 16 will be decreased, thereby causing motor 8 to operate in a direction which decreases the power consumed by motor 1. On the other hand, if the power demanded by motor 1 decreases to a value below the desired value, the reverse operation will take place whereby winding 11 is energized or energized to a greater amount than winding 10, causing the pilot motor 8 to operate in a direction which restores the power demanded by motor 1 to the desired value.

It will be noted that the control system which I provide operates to maintain the apparent power consumed by the motor 1 at a substantially constant value. In many applications, this type of control is sufficiently accurate where the power factor of the load consumed by the load device does not vary materially throughout the range or region of operation. For example, if the load imposed on the motor 1 varies only throughout the upper region of its rating, the power factor will vary only a relatively small percentage and consequently the system operates to maintain not only the apparent power but the true power within a predetermined range of values.

Systems built in accordance with my invention described herein operate to maintain the power consumed at a reasonably constant value, the per cent variation in power being much less than the variation of the voltage. I have found that in a system operated in accordance with my invention, a line voltage change or variation of 10% regulated the power consumed by the motor 1 to maintain the power within 1% of the desired value. A 20% line voltage change involved only a 4% departure from the desired value of power. In other words, the per cent power variation from the desired value for N% variation in line voltage is $N^2/100$ per cent.

Another important feature of my invention is the arrangement which compensates for variations in line voltage. For example, if the line voltage tends to decrease, the system automatically responds to control the amount of power consumed by the motor 1 to maintain the power at the desired constant value, and conversely if the line voltage tends to increase the system controls the motor 1 through pilot motor 8 to maintain the power consumed at the desired value.

Referring now more particularly to the starting operation of the system, the switch 3 may be closed initially and, as explained above, due to the fact that the contactor 33 is initially deenergized the electric valve control means will not be connected to the pilot motor 8. When in the position shown in the drawing, contacts 37 of contactor 33 are closed, thereby connecting the armature 9 and field winding 10 to the supply circuit 2 through transformer 20. Motor 8 is of the type which also operates on alternating current, and the motor is rotated to close substantially valve 7. When the armature 9 of motor 8 attains this predetermined initial position, limit switch 12 is opened by the cam 14, thereby initially setting the system for operation.

Relay 72 prevents the contactor 33 from operating until the motor is started, thereby maintaining the initial setting of the gate 7 until normal voltage is applied to the motor 1. When full voltage is applied to the motor 1, contactor 33 is energized provided that the time delay period established by relay 29 has been completed. After operation of relays 29 and 72, contactor 33 is energized thereby connecting the electric valve regulating system to the pilot motor 8.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, translating apparatus connected to be energized from said alternating current circuit, and means for maintaining the power consumed by said translating apparatus at a substantially constant value comprising means for producing a voltage which varies as the current consumed by said translating apparatus, means for producing a second voltage which varies as the magnitude of the voltage of said alternating current circuit, means for adding the first mentioned and said second voltages, a source of reference voltage of substantially constant value, and means responsive to the difference of said reference voltage and the sum of said voltages for controlling the power supplied to said translating apparatus.

2. In combination, an alternating current circuit, a load device connected to said alternating current circuit, control means for said load device, and means for controlling said control means to maintain the power demanded by said load device at a substantially constant value comprising means for producing a first electrical quantity responsive to the voltage of said alternating current circuit, means for producing a second electrical quantity in response to the current consumed by said load device, means for adding said first and said second electrical quantities, means for producing a reference quantity, and means responsive to the difference of said reference quantity and the sum of said first and second electrical quantities for controlling the power demanded by said device.

3. In combination, an alternating current circuit, a load device connected to said circuit, control means for said device, and means for operating said control means to maintain the power demanded by said load device at a substantially constant value comprising means energized from said alternating current circuit for producing a voltage which varies in accordance with the voltage of said alternating current circuit, means energized in accordance with the current consumed by said load device for producing a second voltage, means for producing a unidirectional voltage which is the rectified sum of said voltages, means for producing a reference voltage, and means responsive to the difference of said reference voltage and said unidirectional voltage for controlling the operation of said device.

4. In combination, an alternating current circuit, a load device connected to said alternating current, control means for said device, and means for controlling said control means to maintain the power demanded by said load device at a substantially constant value comprising means for producing a reference voltage, means for producing a first voltage which varies in accordance with the voltage of said alternating current circuit, means for producing a second voltage which varies in accordance with the current consumed by said load device, means for adding said first and second voltages to produce a summation voltage in opposition to said reference voltage, and means for impressing the algebraic sum of said summation voltage and said reference voltage on said control means to control the power supplied to said device.

5. In combination, an alternating current circuit, means energized from said circuit for producing a voltage which varies in response to the voltage of said circuit, means energized from said circuit for producing a second voltage which varies in accordance with the current of said circuit, means for producing a reference voltage, means for adding the first mentioned voltage and said second voltage and rectifying the sum of said voltages, and means responsive to the difference of said reference voltage and the rectified sum of said voltages for controlling an operating condition of said circuit.

6. In combination, an alternating current circuit, an electric valve means for controlling an electrical condition of said circuit, means for producing a first voltage which varies in accordance with the voltage of said alternating current circuit, means for producing a second voltage which varies in accordance with the current of said alternating current circuit, means for producing a reference voltage of substantially constant value, means for adding said first and second voltages and rectifying the sum to produce a unidirectional voltage, and means responsive to the difference of said reference voltage and the rectified sum of said voltages for controlling said electric valve means and thereby controlling said condition.

7. In combination, an alternating current circuit, means for producing a voltage which varies in accordance with the voltage of said alternating current circuit, means for producing a second voltage which varies in accordance with the current of said alternating current circuit, means for producing a unidirectional voltage having a magnitude dependent upon the sum of said voltages, means for producing a source of reference voltage of substantially constant value and comprising a glow discharge valve, means comprising a voltage divider for obtaining the difference of said reference voltage and said unidirectional voltage, and means responsive to the voltage appearing across said voltage-divider for controlling an electrical condition of said alternating current circuit.

8. In combination, an alternating current circuit, an alternating current load circuit, translating apparatus connected to said load circuit, and means for controlling the power consumed by said translating apparatus and comprising means for producing a voltage which varies in accordance with the magnitude of the voltage of said alternating current circuit, means for producing a second voltage which varies in accordance with the current consumed by said translating apparatus, means for producing a unidirectional voltage which is the rectified sum of said voltages, a source of reference voltage of substantially constant value, and means responsive to the difference of said reference voltage and said unidirectional voltage for controlling the power consumed by said translating apparatus.

9. In combination, an alternating current circuit, a load device energized from said alternating current circuit, means for controlling the load consumed by said load device, means for controlling said last mentioned means and comprising means for producing a unidirectional voltage component which varies in accordance with the current consumed by said load device, a source of reference voltage of substantially constant value, means responsive to the difference of said reference voltage and said unidirectional voltage component for controlling said control means, and means responsive to the magnitude of the voltage of said alternating current circuit for producing a second unidirectional voltage component which modifies the first mentioned unidirectional voltage component thereby compensating the operation of said control means for variations in the voltage of said alternating current circuit.

10. In combination, a source of current, a motor energized from said source, a pilot motor for controlling said first mentioned motor and including armature and excitation circuits, control means for controlling the energization of said armature and excitation circuits to control an operating characteristic of said pilot motor, means for selectively connecting and disconnecting said armature and excitation circuits to and from said control means, means for energizing said armature and excitation circuits to maintain a predetermined initial condition of said pilot motor, and means responsive to a predetermined condition of said motor for rendering said last mentioned means ineffective.

11. In combination, a source of current, a pilot motor for controlling another motor and including armature and excitation circuits, control means for controlling the energization of at least one of said armature and excitation circuits from said source and for controlling and operating characteristic of said pilot motor, means for selectively disconnecting and connecting said pilot motor from and to said control means, and means responsive to the last mentioned means for connecting said pilot motor to said source and for maintaining said pilot motor initially in a predetermined position.

12. In combination, a source of current, a pilot motor for controlling another motor and including armature and excitation circuits, control means for controlling the energization of at least one of said armature and excitation circuits from said source to control an operating characteristic of said pilot motor, contactor means for selectively disconnecting and connecting said pilot motor from and to said control means, and means for connecting said pilot motor to said source when said contactor means is deenergized.

13. In combination, a source of current, a pilot motor for controlling another motor and including armature and excitation circuits, control means for controlling the energization of at least one of said armature and excitation circuits from said source to control an operating characteristic of said pilot motor, contactor means for selectively disconnecting and connecting said armature and excitation circuit from and to said control means, time delay means for delaying energization of said contactor means, and means responsive to a predetermined condition of said contactor means for energizing said pilot motor from said source and for establishing a predetermined initial position of said pilot motor.

14. In combination, a source of current, a pilot motor for controlling another motor and including armature and excitation circuits, control means for controlling the energization of at least one of said armature and excitation circuits from said source to control an operating characteristic of said pilot motor, contactor means for selectively disconnecting and connecting said armature and excitation circuits from and to said control means, time delay means for delaying energization of said contactor means, means responsive to a predetermined condition of said contactor means for energizing said pilot motor from said source and for establishing a predetermined initial position of said pilot motor, and limit switches actuated by said motor for opening the circuit to said pilot motor when said initial position is attained.

15. In combination, a source of current, a pilot motor for controlling another motor and including armature and excitation circuits, control means for controlling the energization of said armature and excitation circuits from said source, to control an operating condition of said pilot motor, means for selectively disconnecting and connecting said armature and excitation circuits from and to said control means, means responsive to said last mentioned means for energizing said armature and excitation circuits to obtain a predetermined initial position of said pilot motor, and limit switches operated by said pilot motor for opening the circuit to said pilot motor when said initial position is attained.

16. In combination, a source of current, a motor energized from said source, starting means connected between said source and said motor, a pilot motor for controlling the operation of the first mentioned motor, control means for controlling a predetermined operating condition of said pilot motor, means for selectively disconnecting and connecting said pilot motor from and to the last mentioned means, and means responsive to the voltage impressed on said first mentioned motor for delaying connection of said control means to said pilot motor.

17. In combination, a source of current, a motor energized from said source, a pilot motor for controlling said first mentioned motor and including armature and excitation circuits, control means for controlling the energization of said armature and excitation circuits to control an operating condition of said pilot motor, means for selectively disconnecting and connecting said armature and excitation circuits from and to said control means, means for delaying operation of said last mentioned means for a predetermined interval of time after energization of said source, and means responsive to the voltage impressed on said motor for preventing connection of said control means to said pilot motor until the voltage has attained a predetermined value.

18. In combination, a source of current, a pilot motor for controlling another motor and including armature and excitation circuits, control means for controlling the energization of said armature and excitation circuits from said source and for controlling an operating condition of said pilot motor, means for rendering said pilot motor responsive to said control means, and means responsive to said last mentioned means for energizing said armature and excitation circuits to establish a predetermined initial condition of said pilot motor.

19. In combination, a source of current, a motor energized from said source, a pilot motor for controlling said first mentioned motor and including armature and excitation circuits, control means for controlling the excitation of said armature and excitation circuits and for controlling an operating condition of said pilot motor, means for rendering said pilot motor responsive to said control means, means responsive to said last mentioned means for energizing said armature and excitation circuits to establish a predetermined initial condition of said pilot motor, and means responsive to the voltage applied to said motor for controlling the last mentioned means.

20. In combination, a source of current, a pilot motor for controlling another motor, control means for controlling an operating condition of said pilot motor, means for rendering said pilot motor responsive to said control means, and means responsive to said last mentioned means for energizing said pilot motor to establish a predetermined initial condition thereof.

HENRY H. LEIGH.

CERTIFICATE OF CORRECTION.

Patent No. 2,331,123. October 5, 1943.

HENRY H. LEIGH.

It is hereby certified that error appears in the printed specification of the above numbered patent requiring correction as follows: Page 5, first column, line 66, claim 13, for the word "circuit" read --circuits--; and second column, line 20, claim 15, after "source" strike out the comma; and that the said Letters Patent should be read with this correction therein that the same may conform to the record of the case in the Patent Office.

Signed and sealed this 23rd day of November, A. D. 1943.

(Seal)

Henry Van Arsdale,
Acting Commissioner of Patents.